(12) United States Patent
Bytheway

(10) Patent No.: US 10,067,604 B2
(45) Date of Patent: Sep. 4, 2018

(54) DETECTING TRIGGER MOVEMENT WITHOUT MECHANICAL SWITCHES

(71) Applicant: CIRQUE CORPORATION, Salt Lake City, UT (US)

(72) Inventor: Jared Bytheway, Sandy, UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

(21) Appl. No.: 15/860,224

(22) Filed: Jan. 2, 2018

(65) Prior Publication Data

US 2018/0188883 A1 Jul. 5, 2018

Related U.S. Application Data

(60) Provisional application No. 62/440,627, filed on Dec. 30, 2016.

(51) Int. Cl.
| | |
|---|---|
| *G06F 3/041* | (2006.01) |
| *A63F 13/214* | (2014.01) |
| *A63F 13/24* | (2014.01) |
| *G06F 3/01* | (2006.01) |
| *G06F 3/02* | (2006.01) |
| *G06F 3/044* | (2006.01) |

(52) U.S. Cl.
CPC .......... *G06F 3/0416* (2013.01); *A63F 13/214* (2014.09); *A63F 13/24* (2014.09); *G06F 3/011* (2013.01); *G06F 3/0202* (2013.01); *G06F 3/044* (2013.01); *G06F 2203/04108* (2013.01)

(58) Field of Classification Search
CPC ...... G06F 3/0416; G06F 3/011; G06F 3/0202; G06F 3/044; G06F 2203/04108; A63F 13/214; A63F 13/24
See application file for complete search history.

(56) References Cited

U.S. PATENT DOCUMENTS

| | | | | |
|---|---|---|---|---|
| 6,590,171 | B1* | 7/2003 | Wolf ........................ | G05G 1/06 200/51 LM |
| 2002/0158515 | A1* | 10/2002 | Anthony, Jr. ........ | H05K 1/0231 307/42 |
| 2002/0158518 | A1 | 10/2002 | Taylor et al. | |
| 2009/0135157 | A1* | 5/2009 | Harley .................. | G06F 3/0416 345/174 |
| 2013/0100021 | A1 | 4/2013 | Larsen et al. | |
| 2014/0315642 | A1* | 10/2014 | Grant ..................... | A63F 13/06 463/38 |

* cited by examiner

*Primary Examiner* — Christopher Kohlman
(74) *Attorney, Agent, or Firm* — Parsons Behle & Latimer

(57) ABSTRACT

A system and method for activating a trigger on an input device, where a capacitive sensor is used for proximity detection of a finger, and wherein the trigger may provide a range of signal levels instead of an on/off signal.

20 Claims, 8 Drawing Sheets

DETECTING TRIGGER MOVEMENT WITHOUT MECHANICAL SWITCHES

BACKGROUND OF THE INVENTION

Field of the Invention

This invention relates generally to touch and proximity sensors. More specifically, the invention relates to a system and method for activating a trigger on an input device, where a capacitive sensor is used for proximity detection of a finger, and wherein the trigger may provide a range of signal levels instead of an on/off signal.

Description of Related Art

Handheld electronic devices have become prolific in recent years. These devices include but are not limited to smartphones, video game controllers, portable video games, TV remotes, cameras, augmented reality glasses, virtual reality glasses, multimedia players etc. There has been a trend to increase their capabilities. One challenge is to create a trigger mechanism in a physical input device such as a game controller that may be used in a virtual reality (VR) or augmented reality (AR) environment.

It is useful to example a touch and proximity sensing touch sensor that may be modified and adapted for use with the embodiments of the invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

Handheld input devices for many electronic games and game controllers typically use a mechanical trigger for a user's index finger. The finger pulls on the mechanical trigger to cause the trigger to activate whatever function may be associated with the trigger. The trigger typically operates as an on/off switch. These triggers are typically manufactured from pieces of thin plastic that are spring-loaded and have significant travel movement when pulled.

Some triggers may also have a mechanical switch near the end of the trigger travel. Still others may have linear sensors such as a potentiometer or a variable optical cut-off or a resistive pill. However, none of these prior art triggers have a way to sense if the finger is hovering just above the trigger surface.

It is also the case in VR and AR environments that it may be desirable to detect and visualize the finger in space so that the player may see a virtual finger in relation to the trigger before it is pressed.

Accordingly, it would be an advantage over the prior art to provide a trigger function that does not require a mechanical switch which may wear out over time. It would also be an advantage to provide a switch that could provide the desired functionality of being able to visualize the finger before it pulls the trigger in a VR or AR environment.

BRIEF SUMMARY OF THE INVENTION

In a first embodiment, the present invention is a system and method for activating a trigger on an input device, where a capacitive sensor is used for proximity detection of a finger, and wherein the trigger may provide a range of signal levels instead of an on/off signal.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The embodiments of the invention may combine the function of proximity sensing of a trigger finger and the linear sensing function of the trigger. The embodiments may also eliminate all the mechanical switches and sensing while retaining the desired mechanical feel of the trigger.

Figure 1:
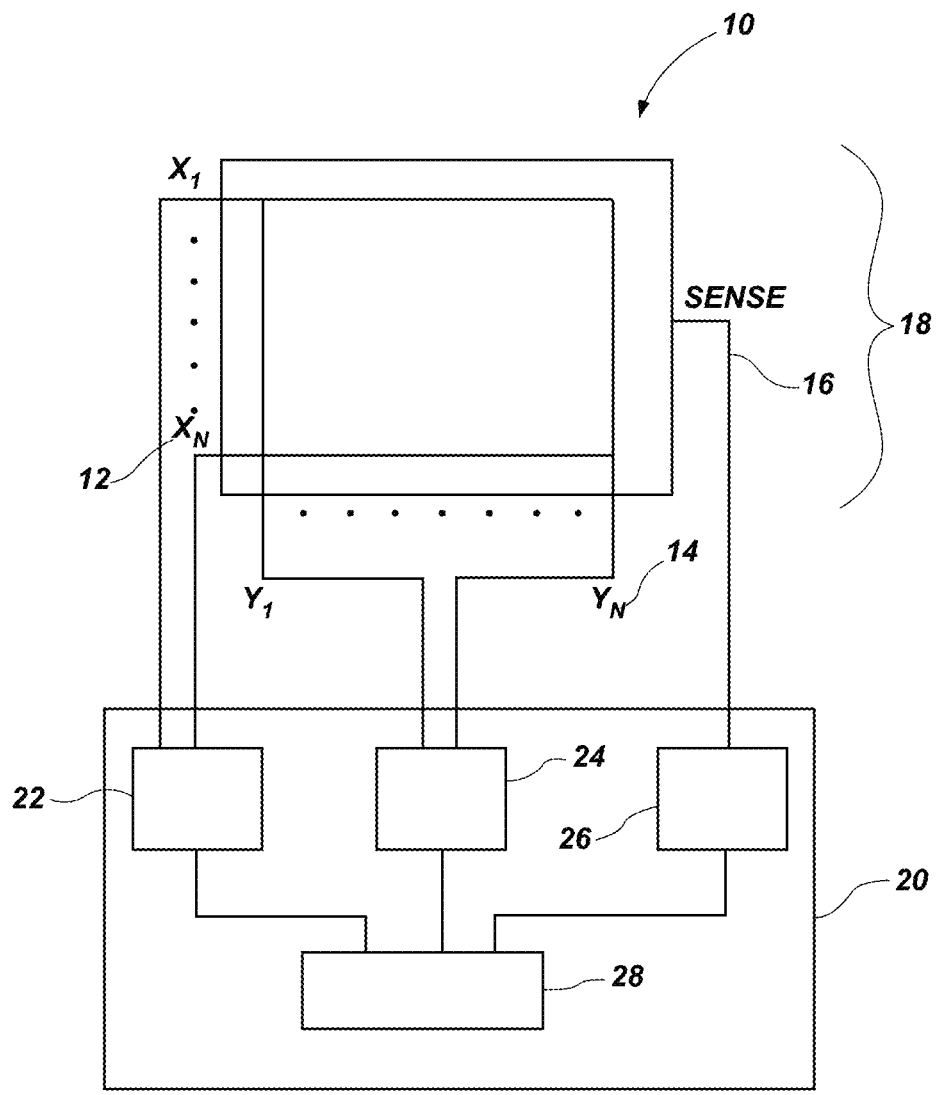
FIG. 1 is a block diagram of operation of a touchpad that is found in the prior art, and which is adaptable for use in the present invention.
Figure 2:
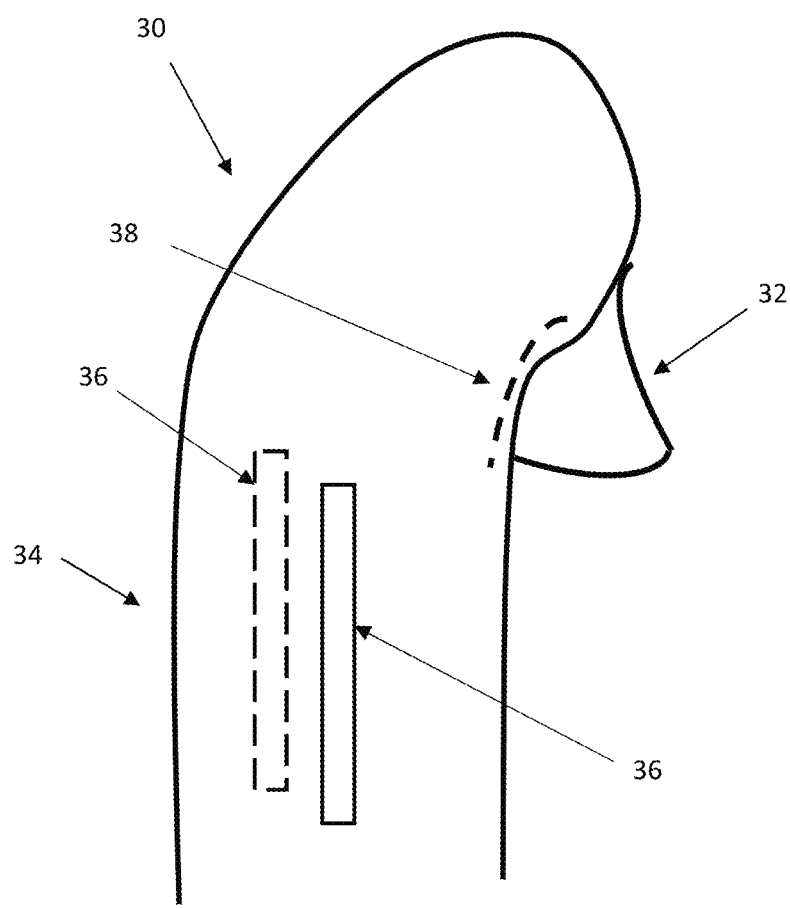
FIG. 2 is a profile view of a hand grip that is equipped with a capacitive trigger instead of a mechanical trigger, thereby extending the life of the trigger, and providing a trigger that provides a range of signals instead of an on/off signal.

The embodiments of the invention may be directed to a new non-mechanical trigger. FIG. 2 is provided as a profile view of a hand grip 30 and a trigger 32 of the embodiments of the invention. It should be understood that the hand grip 30 and the trigger 32 are only examples of the many possible hand grips and trigger shapes and configurations that may be modified to include the embodiments of the invention, and should not be considered as limiting of the scope of the invention. What is important is that the hand grip 30 includes a shaft 34 and the trigger 32, and wherein the trigger is able to pivot or slide as a unit and move backwards as it is depressed. The trigger may move backwards into the hand grip or it may slide backwards into an open space that is not surrounded by the hand grip.

In the first embodiment of the invention, the function of proximity sensing is combined with a linear sensing function as will be explained.

In this embodiment, the user's hand may be driven with a small electric field that is similar to the electric field signals that are on everyday touch sensors found in smartphones and touchscreens and touchpads. In other words, the electric field is not noticeable to the user because it is so small.

In this first embodiment, the user's hand may be driven capacitively, but it may also be driven galvanically. Delivery of a drive signal to the user's hand may be in the form of a metal plate or drive electrode 36 on the shaft 34 of the hand grip 30. The drive electrode 36 may be disposed on either side or on the back of the shaft 34 in order to ensure that a right or left-handed user may receive the drive signal. However, the precise location of the drive electrodes 36 may be moved where convenient and should not be considered as a limiting factor of this embodiment.

A sense electrode 38 may receive a sensed signal from the user's finger on the trigger. The sense electrode 38 may be disposed inside the hand grip 30 and immediately adjacent to the trigger 32. The trigger 32 may be a spring-loaded trigger that feels like any other trigger in the prior art and provides the tactile feedback that is found in the prior art. However, there is no longer a mechanical switch in the trigger 32, and therefore there is no mechanical switch to wear out.

The location and precise shape of the sense electrode 38 may be modified as desired. What is important is that the sense electrode 38 may be disposed right inside the surface of the hand grip 30 so that it is as near to an object that is squeezing the trigger as possible. The sense electrode may also be disposed in a location that does not receive the drive signal in the form of the sensed signal from another part of the user's hand.

Alternatively, the sense electrode 38 may be disposed on the outer surface of the hand grip 30 and immediately adjacent to the trigger 32. The precise location of the sense electrode 38 may be adjusted as needed, as long as the sense electrode is able to detect the drive signal from the finger on the trigger 32, and then detect the approach of the finger towards the sense electrode as the finger squeezes the trigger.

As a user's finger touches the trigger 32 and begins to squeeze, the sense electrode 38 may use proximity sensing to detect the finger before it reaches the hand grip 30. As the finger squeezes the trigger 32, the signal on the sense electrode may increase from a minimum signal level when the finger first touches the trigger 32 and increasing until reaching a maximum signal level when the trigger 32 is fully depressed.

Thus, instead of functioning as a typical mechanical switch of the prior art, the trigger 32 of the embodiments may provide more information. Thus, the user may be able to only partially depress the trigger 32 resulting in a partial change in the signal on the sense electrode 38.

For example, the trigger 32 may function to provide a signal that may vary between a minimum level when the finger makes contact with the trigger and the trigger is at a rest position, all the way to a maximum signal level when the trigger is at a fully depressed position. The finger may or may not be in contact with the hand grip 30 when the trigger 32 is fully depressed. How far the trigger moves may be a function of the trigger 32 and may be a design choice. Nevertheless, the trigger 32 may now be used to provide a signal along a sliding scale between a minimum signal level and a maximum signal level, instead of functioning as a simple on/off signal of the prior art.

Figure 3:
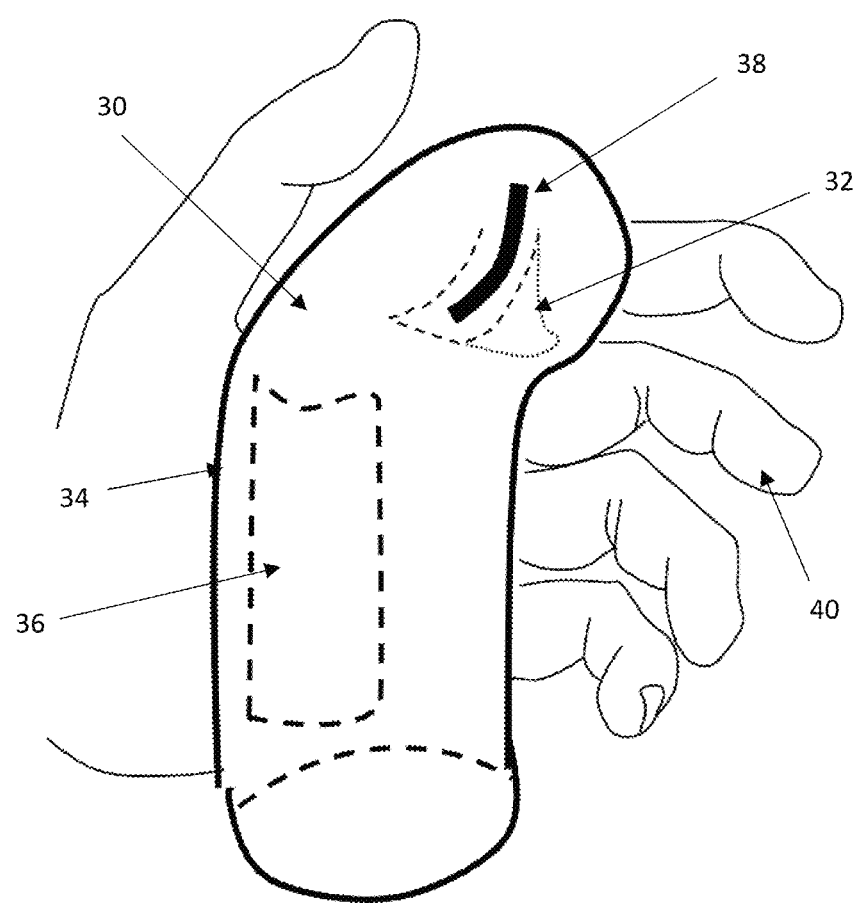
FIG. 3 is a perspective view of the hand grip and trigger of FIG. 2.

FIG. 3 is a perspective view of the hand grip 30, the trigger 32, the shaft 34, the drive electrode 36, the sense electrode 38 inside the hand grip, and a user's hand 40 and fingers that are about to take hold of the hand grip. In this view, there is only a single drive electrode 36 which is a large plate on the side of the shaft 34.

Figure 4:
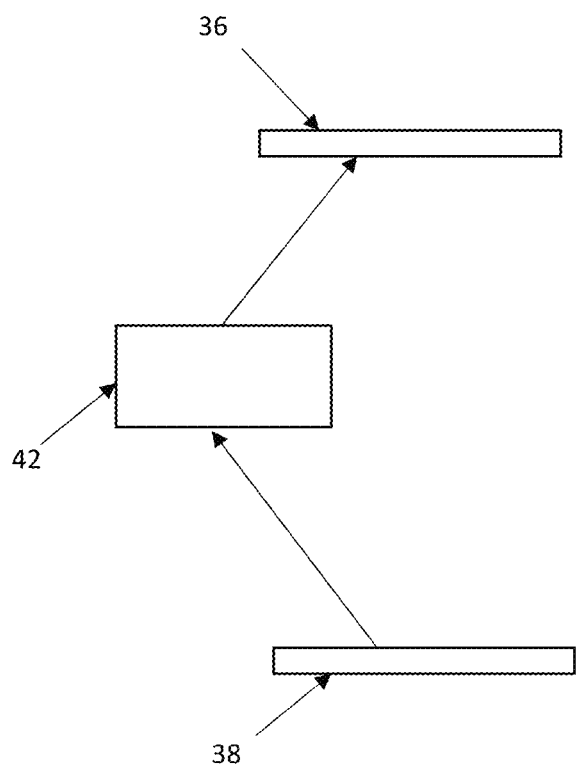
FIG. 4 is a schematic block diagram that shows how the drive and sensed signals are transmitted and received by a touch and proximity sensor controller.

FIG. 4 is a schematic block diagram of the touch and proximity sensor of the sensed signal of the first embodiment. The touch and proximity sensor may include a touch and proximity sensor controller 42 for generating a signal that is transmitted to the user's hand via the drive electrode 36, and the sense electrode 38 that receives the signal from a user's finger on the trigger 32, and then transmits that signal to the touch and proximity sensor controller 42.

The magnitude of the signal from the sense electrode 38 may be used on a sliding scale to determine how far the trigger 32 has been depressed by the user. The trigger 32 may need to be calibrated in order to determine a minimum and a maximum signal that can be obtained by the sense electrode 38.

The touch and proximity sensor controller 42 may be disposed within the hand grip 30 and include wiring to be connected to the drive electrode 36 and to the sense electrode 38.

Figure 5:
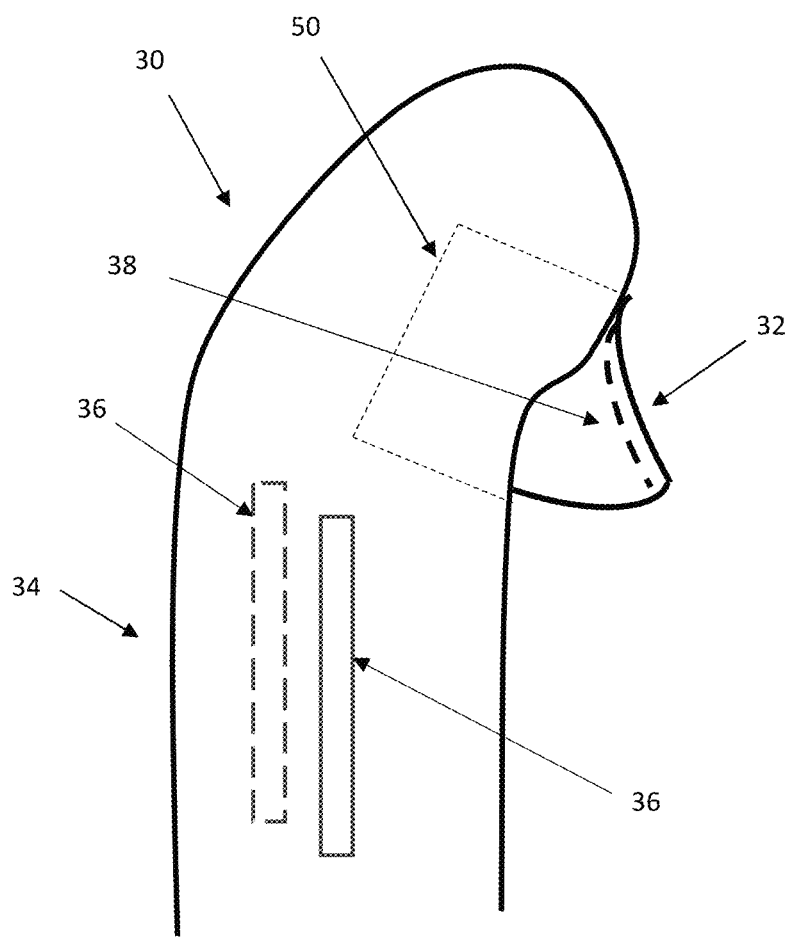
FIG. 5 is a profile view of an alternative embodiment of a hand grip that is equipped with a capacitive trigger.

FIG. 5 is provided as an alternative embodiment of the invention. The sense electrode 38 may be moved so that instead of being inside the hand grip 30, the sense electrode is under the end of the trigger 32. Placing the sense electrode 38 at this location maximizes the distance at which the approach of a finger may be detected.

In all of the embodiments, the trigger 32 may be modified to include a structure inside of a trigger housing 50 inside the hand grip 30 that causes a hard snapping action on the trigger after the trigger has been pulled a certain distance. The purpose of providing a hard snapping action as tactile feedback is that the trigger 32 may be modified to include a particular feel, such as emulating the feel when a hammer of a gun is pulled back and released by a trigger.

Alternatively, the tactile feedback on the trigger 32 may be a gradual increase in friction as an indication of how far the user has pulled the trigger 32. The further that the trigger 32 is pulled, the greater the friction on the trigger movement. The friction being created on the trigger may be a strong spring or movement inhibiting device such as a piston, but should not be considered as limited to these options. Any device that may inhibit movement or increase tension on the trigger that increases in strength the further the trigger is depressed may be considered to be within the scope of the invention.

Figure 6:
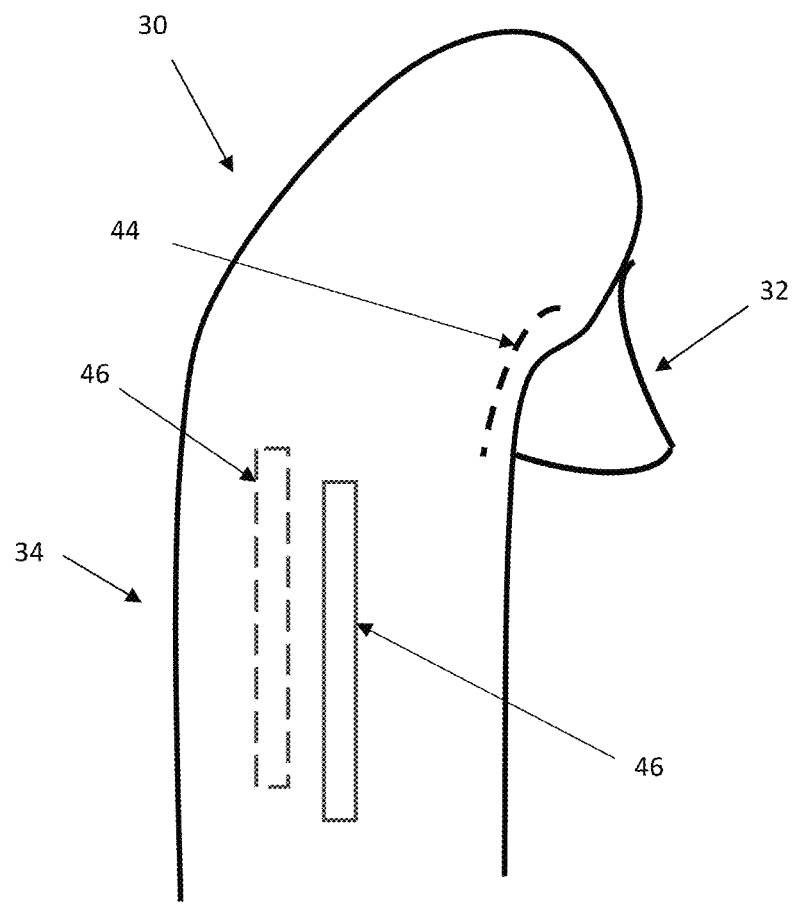
FIG. 6 is a profile view of an alternative embodiment of a hand grip that is equipped with a capacitive trigger.

In another embodiment of the invention shown in FIG. 6, the role of the drive electrodes 36 and the sense electrode 38 may be reversed. In this configuration, a signal is now being transmitted on the drive electrode 44, and the signal is detected on the sense electrodes 46 as the sensed signal.

Figure 7:
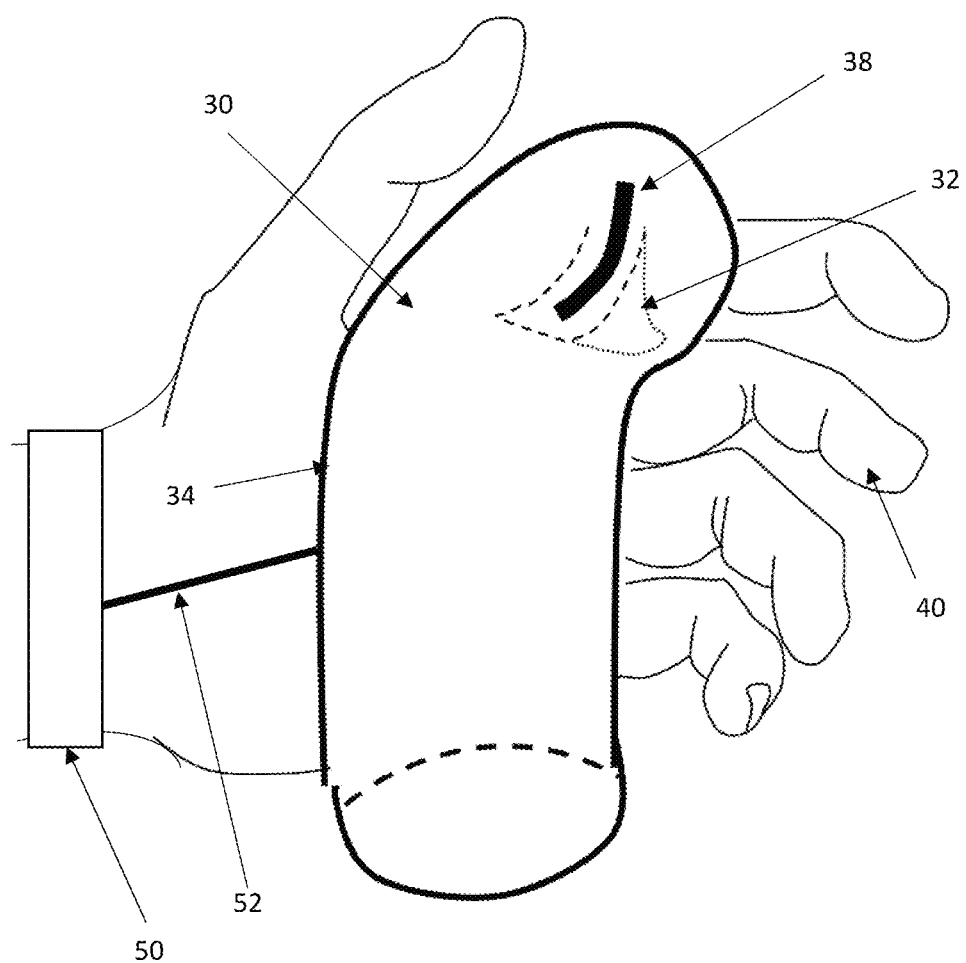
FIG. 7 is a profile view of an alternative embodiment that uses a wrist strap to send the drive signal to the user.

FIG. 7 shows that in another embodiment, a strong connection point to a drive signal may not be the user's hand but may be on a wrist or some other part of the body that has strong coupling. For example, the user may put an elastic strap 50 around a wrist. The elastic strap 50 may include an electrode that is pressed against user's skin in order to transmit the signal to the user's finger, and also include a wire 52 to the hand grip 30 to connect it to the touch and proximity sensor controller 42.

In another embodiment, the touch and proximity sensor controller 42 may have a plurality of sense electrodes 38 near the trigger 32 to thereby enable a higher resolution of the finger location and the finger hover height. An increase in the number of sense electrodes 38 may make this function possible.

Figure 8:
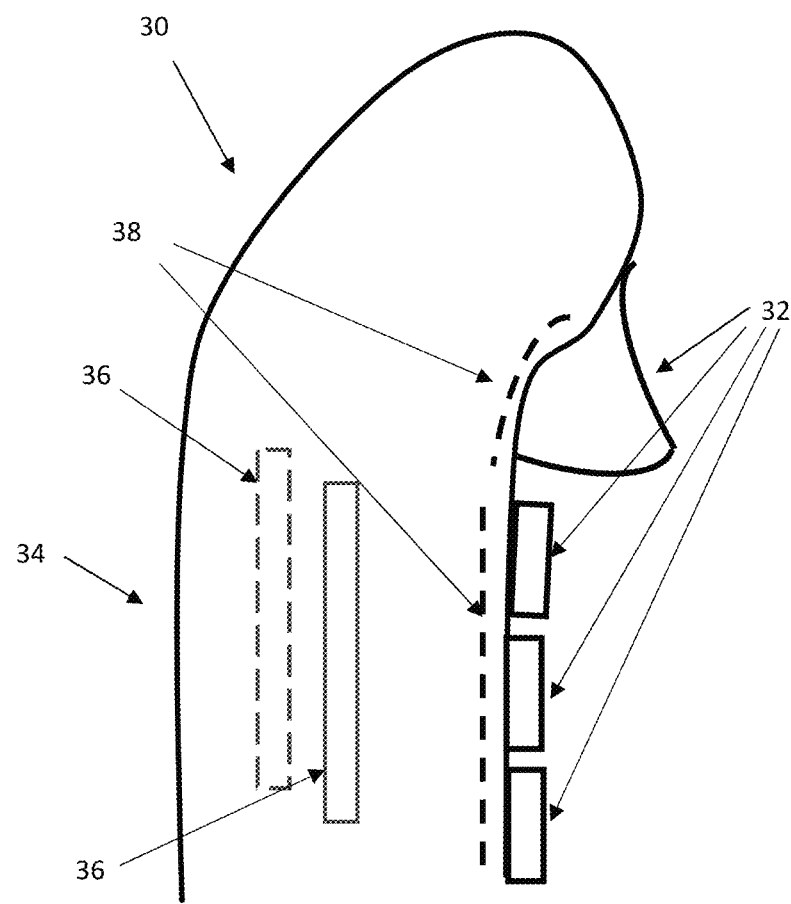
FIG. 8 is a profile view of an alternative embodiment of a hand grip that is equipped with a plurality of capacitive triggers.

In another embodiment of the invention shown in FIG. 8, there may be a plurality of triggers 32 along the shaft 34 of the hand grip 30. These triggers 32 may be placed so that other fingers may depress them towards a sense electrode 38 inside the hand grip 30. Each of the triggers 32 may activate a different function, or they may all collectively provide a signal level for a single function.

In another embodiment of the invention, there may be a haptics engine in the hand grip 30 that may provide a variety of different vibrations in order to provide for simulated responses when the trigger 32 is squeezed.

As a summary of at least one of the embodiments of the invention, the embodiments include a system for providing a non-mechanical trigger function that utilizes proximity sensing. The system may include a hand grip having a shaft for holding the hand grip, a touch and proximity sensor controller disposed in the hand grip for providing a drive signal and for receiving a sensed signal, at least one drive electrode coupled to the touch and proximity sensor controller for receiving the drive signal, and wherein the at least one drive electrode is disposed on the outer surface of the hand grip and transmits a drive signal to a user hand that holds the hand grip.

The embodiments may also include at least one trigger movably attached to the hand grip such that the trigger moves between a depressed position when a force is applied and a rest position when the force is removed, at least one sense electrode coupled to the touch and proximity sensor controller, wherein the at least one sense electrode is disposed immediately adjacent to the trigger, and wherein the touch and proximity sensor controller tracks movement of the trigger as it moves from the rest position to the depressed position when a force is applied by the finger on the trigger by detecting a sensed signal that indicates a change in capacitance on the at least one sense electrode.

One feature of the embodiments may be that the system may include the touch and proximity sensor controller providing a signal, wherein a magnitude of the signal may vary between a minimum signal level when the at least one trigger is at a rest position and a maximum signal level when the at least one trigger is at a fully depressed position.

One aspect of the embodiments may be that the invention may include changing movement characteristics of the at least one trigger by providing a trigger housing for the trigger, wherein the trigger housing is disposed within the hand grip. For example, the system may increase tension on the at least one trigger the further the at least one trigger is depressed by providing a motion inhibiting device in the trigger housing.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for providing a non-mechanical trigger function that utilizes proximity sensing, said system comprised of:

a hand grip having a shaft for holding the hand grip;

a touch and proximity sensor controller disposed in the hand grip for providing a drive signal and for receiving a sensed signal;

at least one drive electrode coupled to the touch and proximity sensor controller for receiving the drive signal, wherein the at least one drive electrode is disposed on the outer surface of the hand grip and transmits a drive signal to a user hand that holds the hand grip;

at least one trigger movably attached to the hand grip such that the trigger moves between a depressed position when a force is applied and a rest position when the force is removed;

at least one sense electrode coupled to the touch and proximity sensor controller, wherein the at least one sense electrode is disposed immediately adjacent to the trigger; and wherein the touch and proximity sensor controller tracks movement of the trigger as it moves from the rest position to the depressed position when a force is applied by the finger on the trigger by detecting a sensed signal that indicates a change in capacitance on the at least one sense electrode.

2. The system for providing a non-mechanical trigger function as defined in claim 1 wherein system is further comprised of the touch and proximity sensor controller providing a signal, wherein a magnitude of the signal may vary between a minimum signal level when the at least one trigger is at a rest position and a maximum signal level when the at least one trigger is at a fully depressed position.

3. The system for providing a non-mechanical trigger function as defined in claim 1 wherein the at least one drive electrode is further comprised of at least two drive electrodes disposed on opposite sides of the shaft.

4. The system for providing a non-mechanical trigger function as defined in claim 1 wherein the at least one trigger is further comprised of a pivoting trigger that rotates around a stationary location at a corner of the trigger, the stationary location being coupled to the hand grip.

5. The system for providing a non-mechanical trigger function as defined in claim 1 wherein the at least one trigger is further comprised of the at least one trigger not pivoting but moving perpendicular to the hand grip to thereby slide into and out of the hand grip.

6. The system for providing a non-mechanical trigger function as defined in claim 1 wherein the at least one trigger is further comprised of a trigger housing for the trigger, wherein the trigger housing is disposed within the hand grip.

7. The system for providing a non-mechanical trigger function as defined in claim 6 wherein the trigger housing is further comprised of a motion inhibiting device that increases tension on the at least one trigger the further the at least one trigger is depressed.

8. The system for providing a non-mechanical trigger function as defined in claim 1 wherein the at least one sense electrode is further comprised of at least one sense electrode disposed inside the at least one trigger.

9. The system for providing a non-mechanical trigger function as defined in claim 1 wherein the system is further comprised of a plurality of sense electrodes in the hand grip to thereby track a proximity position of a user finger.

10. The system for providing a non-mechanical trigger function as defined in claim 1 wherein the at least one drive electrode is further comprised of a wrist strap that is coupled to the at least one drive electrode and attached to the wrist of a user to thereby increase the drive signal on the user.

11. The system for providing a non-mechanical trigger function as defined in claim 1 wherein the system is further comprised of a plurality of triggers disposed on the shaft of the hand grip and a plurality of sense electrodes to thereby enable simultaneous tracking of the plurality of triggers.

12. A method for providing a non-mechanical trigger function that utilizes proximity sensing, said method comprising:

providing a hand grip having a shaft for holding the hand grip;

providing a touch and proximity sensor controller disposed in the hand grip for providing a drive signal and for receiving a sensed signal;

providing at least one drive electrode coupled to the touch and proximity sensor controller for receiving the drive signal, wherein the at least one drive electrode is disposed on the outer surface of the hand grip and transmits a drive signal to a user hand that holds the hand grip;

providing at least one trigger movably attached to the hand grip such that the trigger moves between a depressed position when a force is applied and a rest position when the force is removed;

providing at least one sense electrode coupled to the touch and proximity sensor controller, wherein the at least one sense electrode is disposed immediately adjacent to the trigger; and tracking movement of the trigger as it moves from the rest position to the depressed position when a force is applied by the finger on the trigger by detecting a sensed signal from a user finger that carries the drive signal, wherein the sensed signal indicates a change in capacitance on the at least one sense electrode.

13. The method as defined in claim 12 wherein the method further comprises providing a signal from the touch and proximity sensor controller that indicates the amount that the at least one trigger is being depressed, wherein the signal may vary between a minimum signal level when the at least one trigger is at a rest position and a maximum signal level when the at least one trigger is at a fully depressed position.

14. The method as defined in claim 12 wherein the method further comprises increasing the number of locations that a user hand may make contact with the drive electrodes by disposing at least two drive electrodes on opposite sides of the shaft.

15. The method as defined in claim 12 wherein the method further comprises changing movement characteristics of the at least one trigger by providing a trigger housing for the trigger, wherein the trigger housing is disposed within the hand grip.

16. The method as defined in claim 14 wherein the method further comprises increasing tension on the at least one trigger the further the at least one trigger is depressed by providing a motion inhibiting device in the trigger housing.

17. The method as defined in claim 12 wherein the method further comprises providing of at least one sense electrode disposed inside the at least one trigger to thereby enable the touch and proximity sensor controller to detect a user finger at a longer distance from the trigger.

18. The method as defined in claim 12 wherein the method further comprises more precisely tracking a proximity position of a user finger by providing a plurality of sense electrodes in the hand grip.

19. The method as defined in claim 12 wherein the method further comprises increasing the drive signal on the user by providing at least one drive electrode that is coupled to a wrist strap that is attached to the wrist of a user.

20. The method as defined in claim 12 wherein the method further comprises simultaneously tracking a plurality of triggers by disposing a plurality of triggers on the shaft of the hand grip and a plurality of sense electrodes in the hand grip.

* * * * *